(12) United States Patent
Hotta

(10) Patent No.: US 8,960,167 B2
(45) Date of Patent: Feb. 24, 2015

(54) VENTILATION CONTROL APPARATUS FOR INTERNAL COMBUSTION ENGINE

(75) Inventor: Shintaro Hotta, Suntou-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/981,188

(22) PCT Filed: Oct. 31, 2011

(86) PCT No.: PCT/JP2011/075105
§ 371 (c)(1),
(2), (4) Date: Jul. 23, 2013

(87) PCT Pub. No.: WO2013/065112
PCT Pub. Date: May 10, 2013

(65) Prior Publication Data
US 2014/0224232 A1    Aug. 14, 2014

(51) Int. Cl.
*F02B 33/34*    (2006.01)
(52) U.S. Cl.
USPC ...................... 123/568.11; 123/572
(58) Field of Classification Search
USPC ................. 123/568.11–568.32, 559.1–559.3, 123/572–574
See application file for complete search history.

(56) References Cited

U.S. PATENT DOCUMENTS

| | | | |
|---|---|---|---|
| 5,611,204 A * | 3/1997 | Radovanovic et al. | 60/605.2 |
| 2008/0295814 A1* | 12/2008 | Breuninger et al. | 123/572 |
| 2009/0308364 A1* | 12/2009 | Konohara | 123/572 |
| 2009/0320809 A1* | 12/2009 | Ruppel et al. | 123/563 |
| 2014/0318514 A1* | 10/2014 | Pursifull | 123/568.29 |

FOREIGN PATENT DOCUMENTS

| | | |
|---|---|---|
| JP | 7 279640 | 10/1995 |
| JP | 2006 226159 | 8/2006 |
| JP | 2007 138790 | 6/2007 |
| JP | 2008 232091 | 10/2008 |
| JP | 2009 2286 | 1/2009 |

OTHER PUBLICATIONS

International Search Report Issued Jan. 24, 2012 in PCT/JP11/075105 Filed Oct. 31, 2011.

* cited by examiner

*Primary Examiner* — M. McMahon
(74) *Attorney, Agent, or Firm* — Oblon, Spivak, McClelland, Maier & Neustadt, L.L.P.

(57) ABSTRACT

A ventilation control apparatus for a supercharged internal combustion engine that can perform crankcase ventilation favorably. A system includes a supercharging system, an EGR mechanism, and a blow-by gas reflux mechanism. The EGR mechanism includes an ejector between an EGR valve and an EGR cooler. A suction port is connected to a cylinder head cover via a PCV passage. A nozzle portion is connected to an EGR passage on the EGR cooler side. A diffuser portion is connected to the EGR passage on the EGR valve side. By making EGR gas flow through the EGR passage, gas in the crankcase can be drawn through the PCV passage to thereby be burned, together with the EGR gas or fresh air, in an engine.

10 Claims, 9 Drawing Sheets

VENTILATION CONTROL APPARATUS FOR INTERNAL COMBUSTION ENGINE

TECHNICAL FIELD

The present invention relates, in general, to ventilation control apparatuses for internal combustion engines and, in particular, to a ventilation control apparatus for an internal combustion engine that treats blow-by gases.

BACKGROUND ART

A known blow-by gas reflux apparatus reintroduces to an internal combustion engine by way an intake manifold, and burns, gases that flow through a gap between a piston and a cylinder wall surface of the internal combustion engine into a crankcase without allowing the gases to be released into the atmosphere. For example, patent document 1 discloses a blow-by reflux apparatus that includes a first positive crankcase ventilation (PCV) passage connecting a cylinder head and an intake passage of the internal combustion engine, a second PCV passage connecting a portion of the intake passage downstream of a connection between the first PCV passage and the cylinder head, and a PCV valve disposed at the second PCV passage. The blow-by gas reflux apparatus uses pressure inside the intake manifold (intake manifold pressure) that is a negative pressure. The blow-by gas reflux apparatus introduces the blow-by gas from the crankcase to the first PCV passage and, at the same time, introduces fresh air from the second PCV passage to the crankcase to thereby ventilate the crankcase.

In addition, an exhaust gas recirculation (EGR) apparatus is known wherein part of exhaust is introduced to the intake manifold and mixed with intake air. Patent document 2, for example, discloses a supercharged internal combustion engine including an EGR apparatus. The supercharged internal combustion engine includes an EGR passage that connects an exhaust passage upstream of an exhaust turbine and an intake passage downstream of a compressor, an ejector disposed on the EGR passage, and a connecting passage that connects a portion of the intake passage upstream of a connection between the intake passage and the EGR passage and the ejector. In the supercharged internal combustion engine, the ejector is disposed such that a nozzle portion thereof is upstream (specifically, on the exhaust passage side) of the EGR passage and a diffuser portion thereof is downstream (specifically, on the intake passage side) of the EGR passage. When an EGR gas is introduced, therefore, the EGR gas flowing through the ejector allows the intake air in the connecting passage to be drawn into the EGR passage, so that a flow rate of intake air introduced to the intake manifold can be increased.

PRIOR ART DOCUMENTS

Patent Document

Patent Document 1
JP-A-2006-226159
Patent Document 2
JP-A-2008-232091
Patent Document 3
JP-A-07-279640
Patent Document 4
JP-A-2009-2286
Patent Document 5
JP-A-2007-138790

SUMMARY OF THE INVENTION

Application of the above-described blow-by gas reflux apparatus to the above-described supercharged internal combustion engine, however, poses the following problem. Specifically, a supercharging range in which the supercharger is to be operated includes a zone in which the intake manifold pressure is a positive pressure. A positive intake manifold pressure reduces an amount of blow-by gas introduced to the intake manifold. Then, gas stagnates inside the crankcase, which causes a crankcase internal pressure to build up. It is here noted that a supercharged internal combustion engine tends to develop a cylinder pressure higher than in an internal combustion engine having no superchargers and allow the crankcase internal pressure, in particular, to increase easily. In the supercharged internal combustion engine, therefore, crankcase ventilation is insufficient, which may expedite deterioration of oil.

The present invention has been made in view of the foregoing problem. It is an object of the present invention to provide a ventilation control apparatus for a supercharged internal combustion engine that can perform crankcase ventilation favorably.

Means for Solving the Problem

To achieve the above mentioned purpose, a first aspect of the present invention is a ventilation control apparatus for an internal combustion engine, comprising:

a supercharger including a compressor disposed at an intake passage of an internal combustion engine and an exhaust turbine disposed at an exhaust passage of the internal combustion engine;

a first bypass passage connecting a portion of the exhaust passage upstream of the exhaust turbine and a portion of the intake passage downstream of the compressor;

a first PCV passage connecting, at a midway point in the first bypass passage, a cylinder head of the internal combustion engine and the first bypass passage; and first gas introducing means disposed at a connection point between the first bypass passage and the first PCV passage, the first gas introducing means for introducing blow-by gas flowing through the first PCV passage to the first bypass passage using a differential pressure between internal pressure in the exhaust passage upstream of the exhaust turbine and internal pressure in the intake passage downstream of the compressor.

A second aspect of the present invention is the ventilation control apparatus for an internal combustion engine according to the first aspect further comprising:

escape control determining means for determining whether there is a request for escape control that causes intake air flow to be escaped from the intake passage to the exhaust turbine via the first bypass passage; and introduction prohibiting means for prohibiting blow-by gas flowing through the first PCV passage from being introduced to the first bypass passage when it is determined that there is a request for the escape control.

A third aspect of the present invention is the ventilation control apparatus for an internal combustion engine according to the first or second aspect further comprising:

a PCV valve disposed at the first PCV passage, the PCV valve for permitting or prohibiting connection between the first PCV passage and the first gas introducing means.

A forth aspect of the present invention is the ventilation control apparatus for an internal combustion engine according to any one of the first to third aspect further comprising:

exhaust cooling means disposed at the first bypass passage, the exhaust cooling means for cooling exhaust to be recirculated from the exhaust passage to the intake passage;

cold starting determining means for determining whether the internal combustion engine is under a predetermined condition for cold starting; and cooling prohibiting means for prohibiting the exhaust cooling means from cooling exhaust when the internal combustion engine is under the predetermined condition for cold starting.

A fifth aspect of the present invention is the ventilation control apparatus for an internal combustion engine according to any one of the first to fourth aspect further comprising:

a second bypass passage for bypassing the compressor in the intake passage;

a second PCV passage connecting, at a midway point in the second bypass passage, a cylinder head of the internal combustion engine and the second bypass passage; and second gas introducing means disposed at a connection point between the second bypass passage and the second PCV passage, the second gas introducing means for introducing blow-by gas flowing through the second PCV passage to the second bypass passage using a differential pressure between internal pressure in the intake passage upstream of the compressor and internal pressure in the intake passage downstream of the compressor.

Effects of the Invention

In the first aspect of the present invention, the first gas introducing means is disposed at a connection point between the first bypass passage and the first PCV passage. This allows the blow-by gas flowing through the first PCV passage to be introduced to the first bypass passage when a differential pressure occurs between the internal pressure in the exhaust passage upstream of the exhaust turbine and the internal pressure in the intake passage downstream of the compressor. The differential pressure can be produced by making exhaust gas (specifically, the EGR gas) flow from the exhaust passage upstream of the exhaust turbine to the intake passage downstream of the compressor. Ventilation of the crankcase can therefore be favorably performed even in a range in which the intake manifold pressure is positive.

When the escape control is to be performed, a counterflow occurs opposite to the direction of flow of the exhaust gas in the first aspect of the present invention. As a result, the blow-by gas flowing through the first PCV passage may flow into the exhaust passage, instead of the intake passage. In this respect, in the second aspect of the present invention, the blow-by gas flowing through the first PCV passage can be prohibited from flowing into the first bypass passage using the introduction prohibiting means. The blow-by gas flowing through the first PCV passage can therefore be prevented from flowing into the exhaust passage.

In the third aspect of the present invention, connection between the first PCV passage and the first gas introducing means can be permitted or prohibited using the PCV valve. If crankcase internal pressure decreases when the exhaust gas is made to flow from the exhaust passage toward the intake passage, the exhaust gas may flow through the first PCV passage into the crankcase. In this respect, the PCV valve may, for example, be controlled so as to prohibit the connection between the first PCV passage and the first gas introducing means, which prevents such an inflow of gas.

The exhaust gas flowing from the exhaust passage to the intake passage contains water vapor. The water vapor liquefies when the exhaust gas is cooled by the exhaust cooling means. If the internal combustion engine is under a predetermined condition for cold starting, the water vapor may solidify. Then, an inside of the first gas introducing means may be blocked. In this respect, in the fourth aspect of the present invention, the cooling prohibiting means prohibits the exhaust cooling means from cooling the exhaust, so that such an internal blockage can be prevented.

In the fifth aspect of the present invention, the second gas introducing means is disposed at a connection point between the second bypass passage and the second PCV passage. This allows the blow-by gas flowing through the second PCV passage to be introduced to the second bypass passage when a differential pressure occurs between the internal pressure in the intake passage upstream of the compressor and the internal pressure in the intake passage downstream of the compressor. The above differential pressure can be produced by supercharging the intake air. By combining the fifth aspect of the present invention with the first aspect of the present invention, therefore, ventilation of the crankcase can be favorably performed through a wide supercharging range.

MODES FOR CARRYING OUT THE INVENTION

First Embodiment

[Configuration of Ventilation Control Apparatus]

Figure 1:
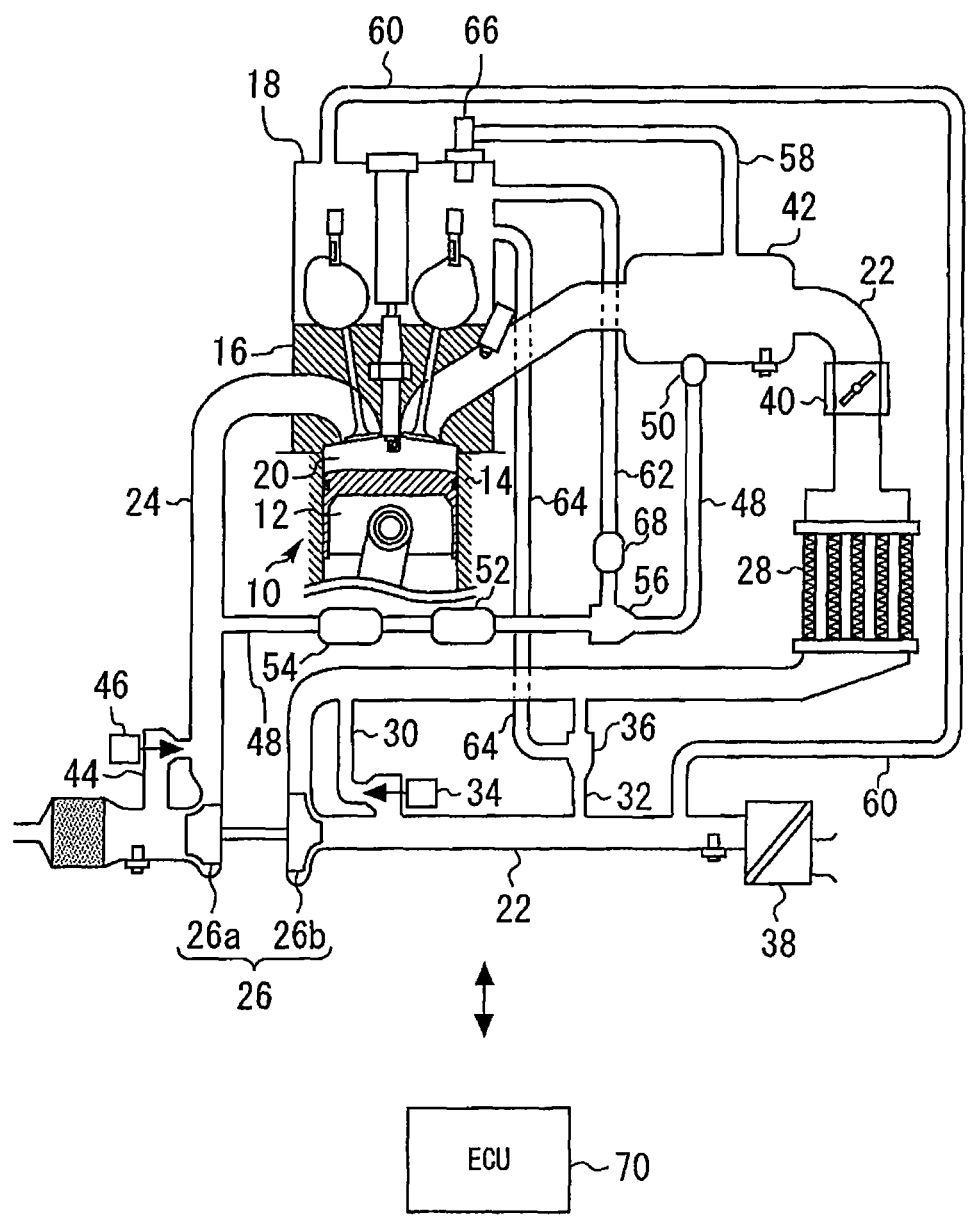
FIG. 1 is an illustration showing a system configuration of a ventilation control apparatus according to each embodiment of the present invention.

A first embodiment of the present invention will be described below with reference to FIGS. 1 to 8. FIG. 1 is an illustration showing a system configuration of a ventilation control apparatus of this embodiment. Referring to FIG. 1, the system of the embodiment includes an engine 10 as an internal combustion engine. The engine 10 may have any number of cylinders and any cylinder arrangement. The engine 10 includes a cylinder block 14 having a piston 12 thereinside. A cylinder head 16 is fitted to an upper portion of the cylinder block 14. The cylinder head 16 is covered with a cylinder head cover 18. A space from an upper surface of the piston 12 to the cylinder head 16 forms a combustion chamber 20. The cylinder head 16 has an intake passage 22 and an exhaust passage 24 that communicate with the combustion chamber 20.

The system of this embodiment further includes a supercharger 26. The supercharger 26 includes a turbine 26a and a compressor 26b. The turbine 26a is disposed at the exhaust passage 24, while the compressor 26b is disposed at the intake passage 22. The turbine 26a and the compressor 26b are connected to each other. During operation of the supercharger 26, the compressor 26b is driven by the turbine 26a that receives exhaust pressure and is thereby rotated. Then, the compressor 26b compresses and supercharges intake air.

The intake passage 22 includes an intercooler 28 that cools the intake air supercharged by the compressor 26b. The intake passage 22 includes air bypass passages 30, 32 disposed upstream of the intercooler 28. The air bypass passage 30 has an air bypass valve (ABV) 34. The ABV 34 is opened to thereby prevent a surge in boost pressure. The air bypass passage 32 has an ejector 36. The ejector 36 will be described in detail later. The intake passage 22 further includes an air cleaner 38 disposed upstream of the intercooler 28. Meanwhile, the intake passage 22 includes an electronically controlled throttle valve 40 disposed downstream of the intercooler 28. The intake passage 22 further includes a surge tank 42 disposed downstream of the throttle valve 40.

The exhaust passage 24 includes an exhaust bypass passage 44 that bypasses the turbine 26a. The exhaust bypass passage 44 has an electromagnetically driven waste gate valve (WGV) 46. Opening the WGV 46 allows back pressure to be adjusted, so that engine pump loss or an amount of exhaust gas left in cylinders can be reduced.

The system of this embodiment further includes an EGR mechanism that recirculates exhaust gas from the exhaust passage 24 to the intake passage 22. The EGR mechanism includes an EGR passage 48 that connects a portion of the exhaust passage 24 upstream of the turbine 26a and the surge tank 42. The EGR passage 48 has an EGR valve 50 that adjusts an amount of EGR gas, a water-cooling EGR cooler 52, and an EGR catalyst 54 disposed thereon. The EGR valve 50 is disposed closest to the surge tank 42, while the EGR catalyst 54 is disposed close to the exhaust passage 24. In addition, the EGR mechanism includes an ejector 56 disposed between the EGR valve 50 and the EGR cooler 52. The ejector 56 will be described together with the ejector 36 in detail later.

The system of this embodiment further includes a blow-by gas reflux mechanism that makes blow-by gas flow back. Blow-by gas refers to a type of gas that flows through a gap between the piston 12 and a cylinder wall surface into a crankcase, containing unburned fuel or an oil mist. The blow-by gas reflux mechanism includes four types of PCV passages 58, 60, 62 and 64. The PCV passage 58 connects the cylinder head cover 18 and the surge tank 42. The PCV passage 58 has a PCV valve 66 disposed thereon. The PCV passage 60 connects cylinder head cover 18 and the intake passage 22 at a portion upstream of the compressor 26b. The PCV passage 62 connects a suction port 56a of the ejector 56 and the cylinder head cover 18. The PCV passage 62 has a PCV valve 68 disposed thereon. The PCV passage 64 connects a suction port 36a of the ejector 36 and the cylinder head cover 18.

In addition, the system of this embodiment includes an electronic control unit (ECU) 70. Various types of sensors required for controlling the engine 10 are connected to an input side of the ECU 70, including a throttle opening sensor for detecting an opening degree of the throttle valve 40 and a temperature sensor for detecting a coolant temperature of the engine 10. Various types of actuators including the ABV 34, the throttle valve 40, the WGV 46, and the EGR valve 50 are connected to an output side of the ECU 70.

Figure 2:
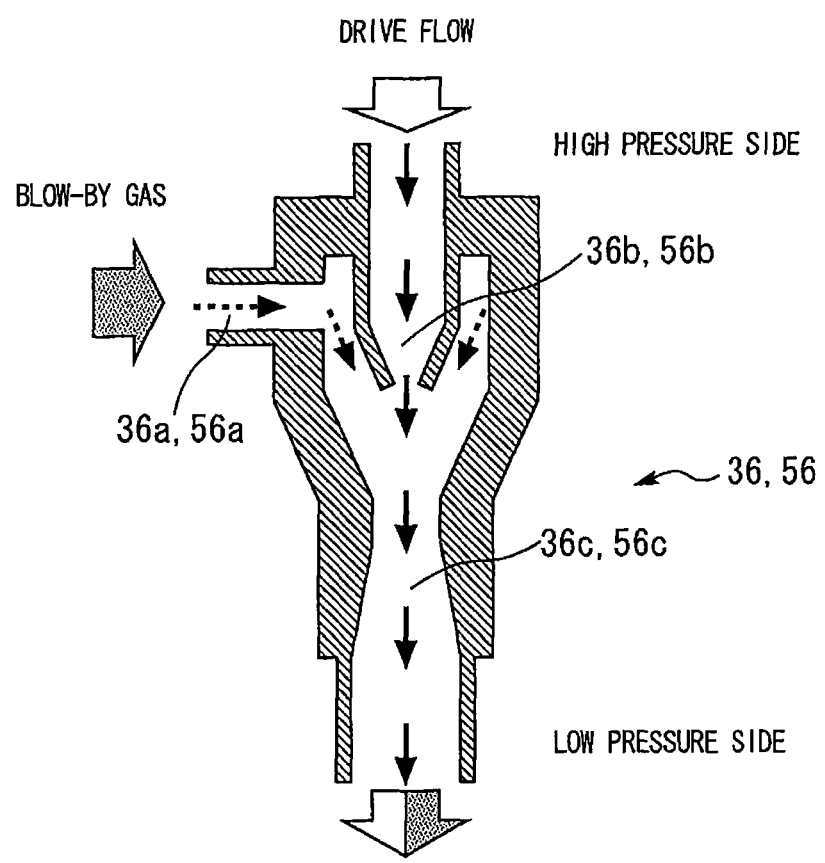
FIG. 2 is an illustration illustrating a structure of the ejectors 36, 56.

FIG. 2 is an illustration illustrating a structure of the ejectors 36, 56. The ejectors 36, 56 include the suction ports 36a, 56a, nozzle portions 36b, 56b, and diffuser portions 36c, 56c, respectively. The suction port 36a is connected to one end of the PCV passage 64. The nozzle portion 36b is connected to the air bypass passage 32 on the side of the intercooler 28. The diffuser portion 36c is connected to the air bypass passage 32 on the side of the air cleaner 38. The suction port 56a is connected to one end of the PCV passage 62. The nozzle portion 56b is connected to the EGR passage 48 on the side of the EGR cooler 52. The diffuser portion 56c is connected to the EGR passage 48 on the side of the EGR valve 50. As shown by the arrow in FIG. 2, when a drive flow flows through an inside of the ejector, the drive flow allows a suction flow flowing from the suction ports 36a, 56a toward the diffuser portions 36c, 56c to be generated. This allows gas inside the PCV passage 64 to be introduced to the air bypass passage 32 and gas inside the PCV passage 62 to be introduced to the EGR passage 48, respectively.

[Characteristics of the First Embodiment]

Figure 3:
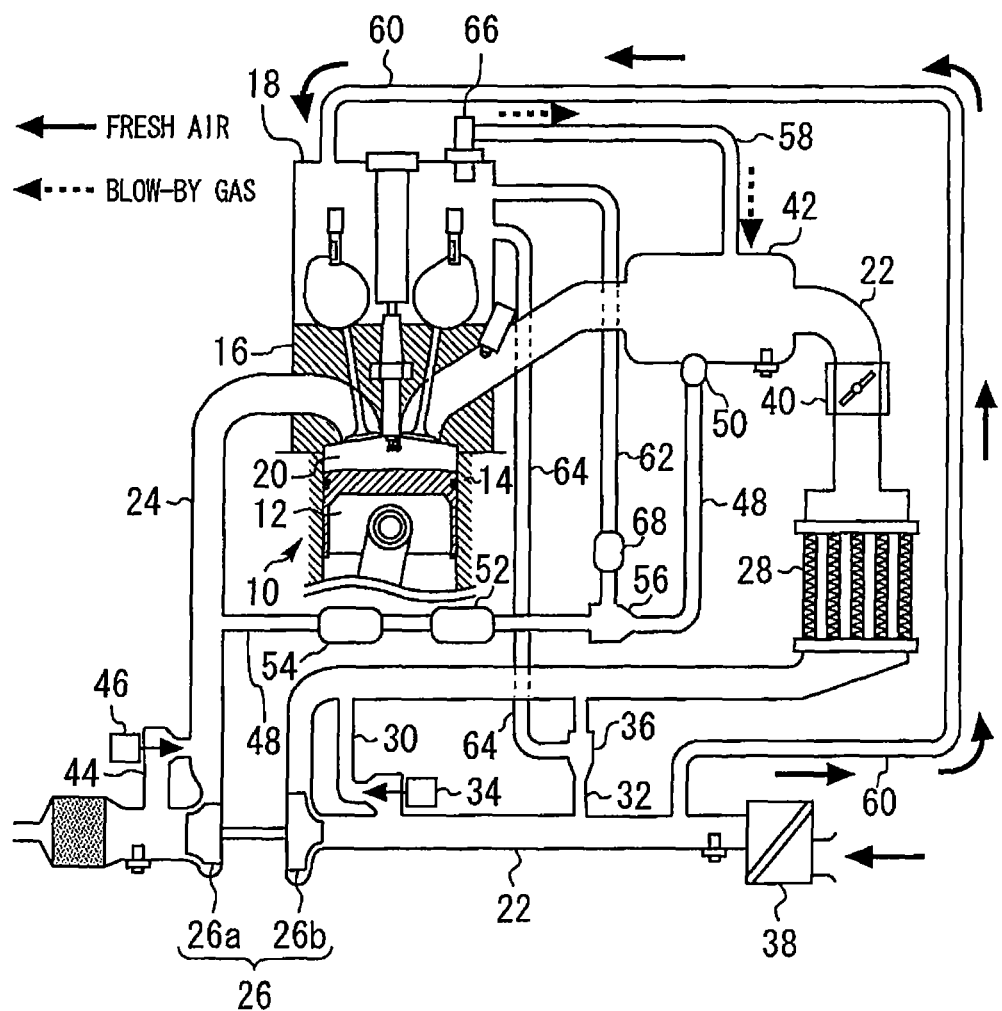
FIG. 3 is an illustration illustrating a flow of blow-by gas in a natural aspiration range.

FIG. 3 is an illustration illustrating a flow of blow-by gas in a natural aspiration range. In the natural aspiration range, a certain level of negative pressure can be ensured in a line downstream of the throttle valve 40. Gas inside the crankcase, therefore, flows via the cylinder head cover 18 and the PCV passage 58 into the surge tank 42. At this time, fresh air flows into the crankcase from the intake passage 22 by way of the PCV passage 60 and the cylinder head cover 18.

Figure 4:
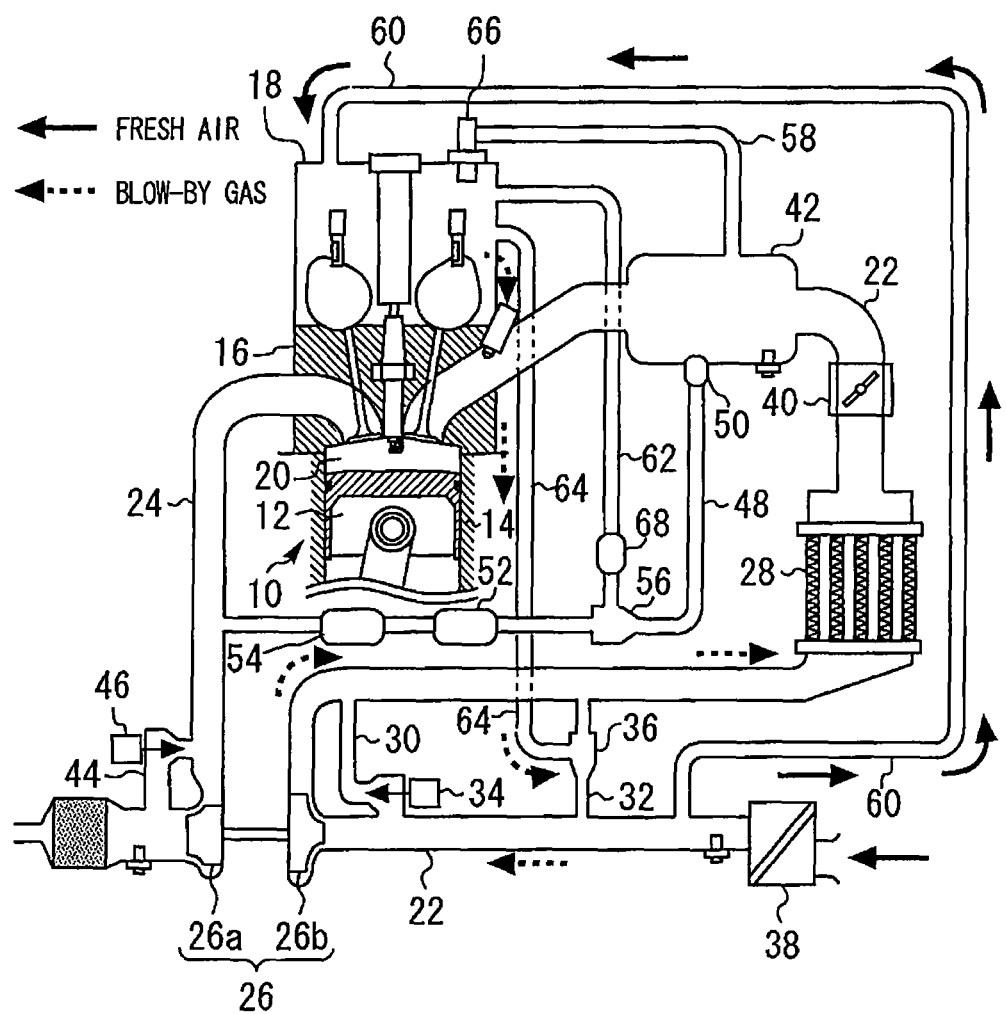
FIG. 4 is an illustration illustrating the flow of blow-by gas in the supercharging range.

It is here noted that, in a supercharging range in which the supercharger 26 is operated, the crankcase can be ventilated using the boost pressure. The ventilation will be described below with reference to FIG. 4. FIG. 4 is an illustration illustrating the flow of blow-by gas in the supercharging range. In the supercharging range, pressure in the line downstream of the compressor 26b is higher than pressure in the line upstream thereof. A drive flow can therefore be generated inside the ejector 36. The gas inside the crankcase can therefore be drawn through the PCV passage 64 and introduced to the surge tank 42 via the air bypass passage 32 so as to be reburned in the engine 10.

Intake manifold pressure is, however, positive in part of the supercharging range. Specifically, the intake manifold pressure is positive in a medium load range and gas inside the crankcase tends to stagnate. As the stagnant gas increases, crankcase internal pressure builds up, so that the crankcase becomes insufficiently ventilated. The WGV 46 is then closed to thereby increase the boost pressure, which permits the drive flow inside the ejector 36. The assurance of the drive flow will be described with reference to FIG. 5.

Figure 5:
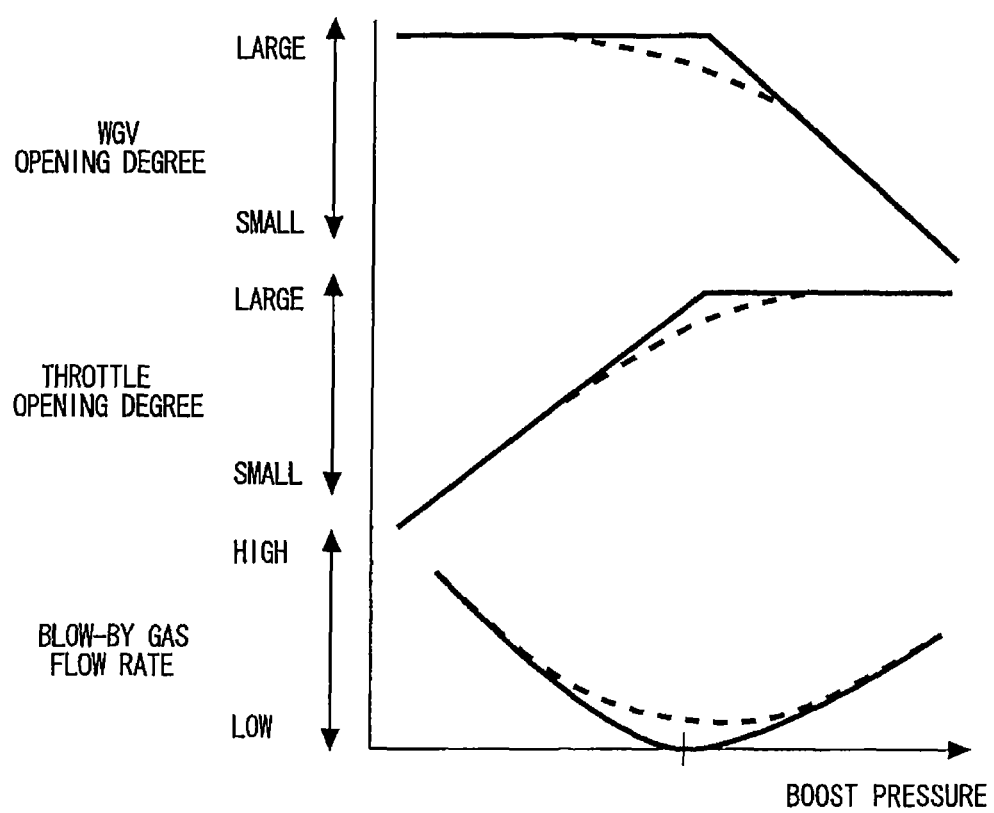
FIG. 5 is a graph showing opening degrees of the WGV 46, opening degrees of the throttle valve 40, and a blow-by gas flow rate relative to the boost pressure.

FIG. 5 is a graph showing opening degrees of the WGV 46, opening degrees of the throttle valve 40, and a blow-by gas flow rate relative to the boost pressure. It is noted, in FIG. 5, the blow-by gas flow rate represents the total amount of blow-by gas reintroduced to the engine 10. As shown by the solid line in FIG. 5, increasing the opening angle of the throttle valve 40 to thereby increase the boost pressure results in the blow-by gas flow rate decreasing. As a result, the blow-by gas flow rate is zero when the throttle opening degree is the largest. If the opening degree of the WGV 46 is made small at this time, the boost pressure can be increased, which permits the drive flow inside the ejector 36. As shown by the dotted line in FIG. 5, therefore, if control is performed to make the opening degree of the WGV 46 small when the boost pressure increases, the blow-by gas flow rate can be prevented from becoming zero. The performance of this control, however, aggravates pump loss and thus aggravates fuel economy.

Figure 6:
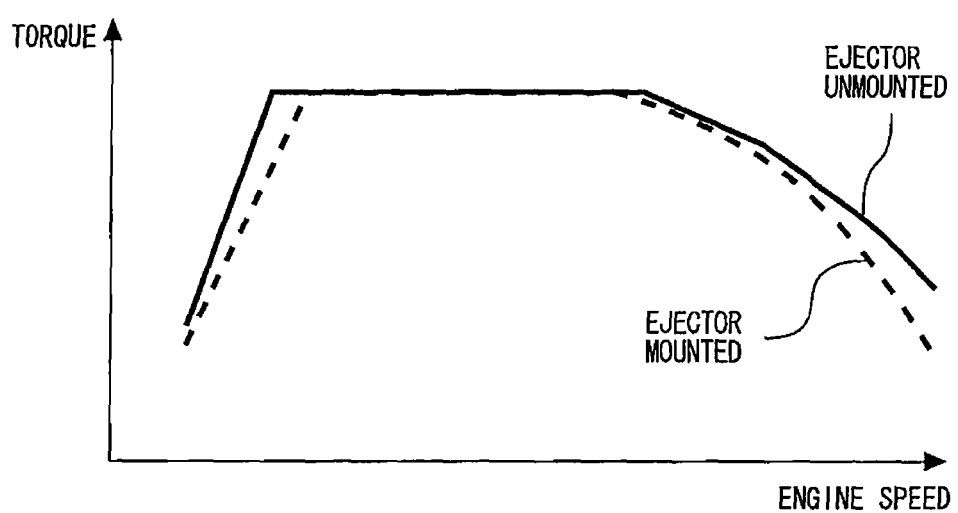
FIG. 6 is a graph showing a relationship between an engine speed and torque.

FIG. 6 is a graph showing a relationship between an engine speed and torque. The solid line in FIG. 6 denotes engine characteristics when the ejector 36 is not mounted and the broken line in FIG. 6 denotes engine characteristics when the ejector 36 is mounted. Referring to FIG. 6, engine performance is degraded in a high speed range when the ejector 36 is mounted as compared when the ejector 36 is not mounted. This is because the performance of the above-described control to make the opening degree of the WGV 46 small increases back pressure, which increases turbo work.

Figure 7:
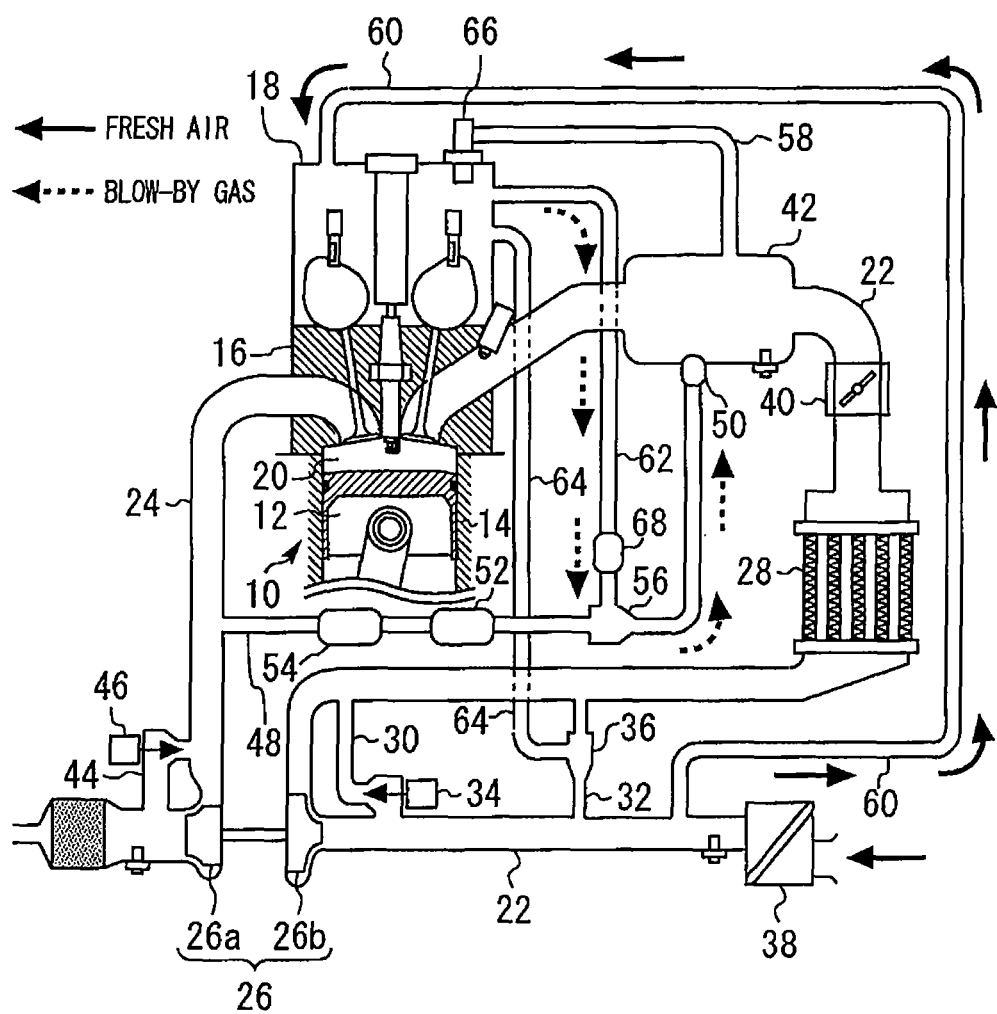
FIG. 7 is an illustration illustrating a flow of the blow-by gas during introduction of the EGR gas.

In this embodiment, therefore, ventilation using the exhaust pressure by the EGR gas is performed. FIG. 7 is an illustration illustrating a flow of the blow-by gas during introduction of the EGR gas. During the introduction of the EGR gas, pressure inside the exhaust passage 24 is higher than the intake manifold pressure. A drive flow can therefore be generated in the ejector 56. As a result, the gas inside the crankcase can be drawn through the PCV passage 62 and introduced to the surge tank 42 via the EGR passage 48 so as to be reburned in the engine 10. This enables ventilation with the above-noted problem eliminated. However, if the crankcase internal pressure decreases during the introduction of the EGR gas, the EGR gas may flow through the ejector 56 and the PCV passage 62 into the crankcase. In this embodiment, therefore, control is performed to close the PCV valve 68 even during the introduction of the EGR gas, if the crankcase internal pressure decreases.

Figure 8:
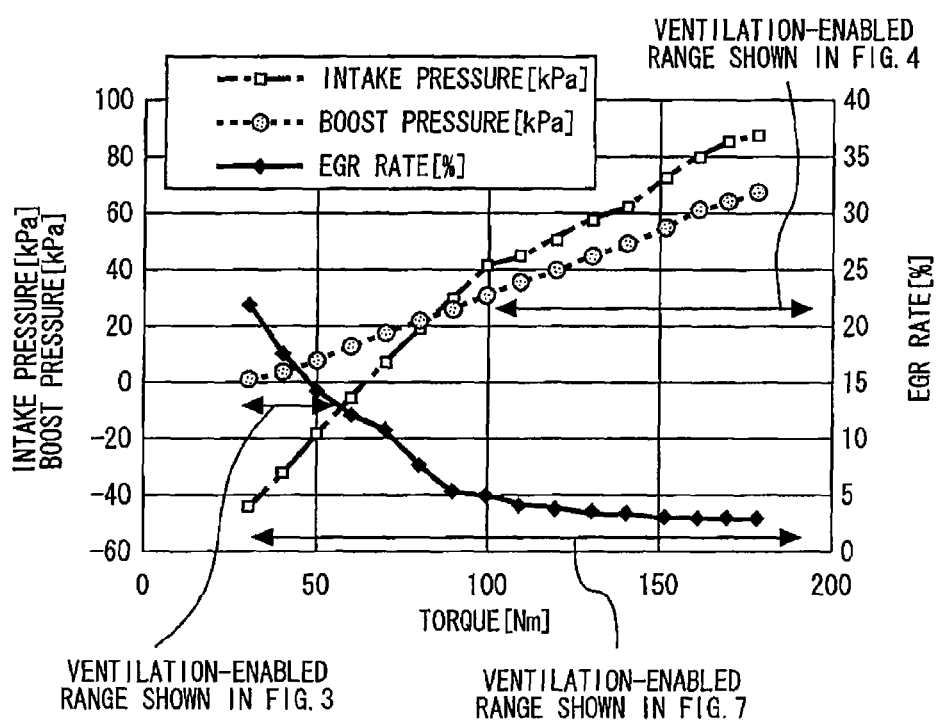
FIG. 8 is a graph showing a relationship among an intake line pressure (intake pressure) and a target boost pressure downstream of the throttle valve 40, torque, and an EGR rate.

In this embodiment, the crankcase ventilation can be performed through an entire range of the natural aspiration range and the supercharging range. A reason for this will be described below with reference to FIG. 8. FIG. 8 is a graph showing a relationship among an intake line pressure (intake pressure) and a target boost pressure downstream of the throttle valve 40, torque, and an EGR rate. Referring to FIG. 8, in a range with low target boost pressures, the intake pressure is negative. As described earlier with reference to FIG. 3, therefore, the gas inside the crankcase can be introduced by way of the PCV passage 58 to the surge tank 42. In a range with high target boost pressures, on the other hand, the boost pressure can be used. As described earlier with reference to FIG. 4, therefore, the gas inside the crankcase can be drawn through the PCV passage 64 and introduced to the surge tank 42 via the air bypass passage 32.

During the introduction of the EGR gas, the gas inside the crankcase can be drawn through the PCV passage 62 and introduced to the surge tank 42 via the EGR passage 48. Even in the medium load range in which the intake manifold pressure is positive (specifically, in the range in which the target boost pressure is medium), therefore, the gas inside the crankcase can be introduced to the surge tank 42. In addition, the introduction of the EGR gas can be performed regardless of whether the target boost pressure is high or low. In this embodiment, therefore, the crankcase ventilation can be performed throughout the entire range of the natural aspiration range and the supercharging range. Additionally, as shown in FIG. 8, in this embodiment, a ventilation-enabled range shown in FIGS. 3 and 4 and a ventilation-enabled range shown in FIG. 7 can be combined with each other. This embodiment therefore allows the crankcase ventilation to be favorably performed throughout the entire range of the natural aspiration range and the supercharging range.

The EGR passage 48 in the first embodiment described above corresponds to the "first bypass passage" in the first aspect of the present invention, the PCV passage 62 in the first embodiment corresponds to the "first PCV passage" in the first aspect of the present invention, and the ejector 56 in the first embodiment corresponds to the "first gas introducing means" in the first aspect of the present invention.

Similarly, the PCV valve 68 in the first embodiment described above corresponds to the "PCV valve" in the third aspect of the present invention.

Additionally, the air bypass passage 32 in the first embodiment described above corresponds to the "second bypass passage" in the fifth aspect of the present invention, the PCV passage 64 in the first embodiment corresponds to the "second PCV passage" in the fifth aspect of the present invention, and the ejector 36 in the first embodiment corresponds to the "second gas introducing means" in the fifth aspect of the present invention.

Second Embodiment

[Characteristics of the Second Embodiment]

Figure 9:
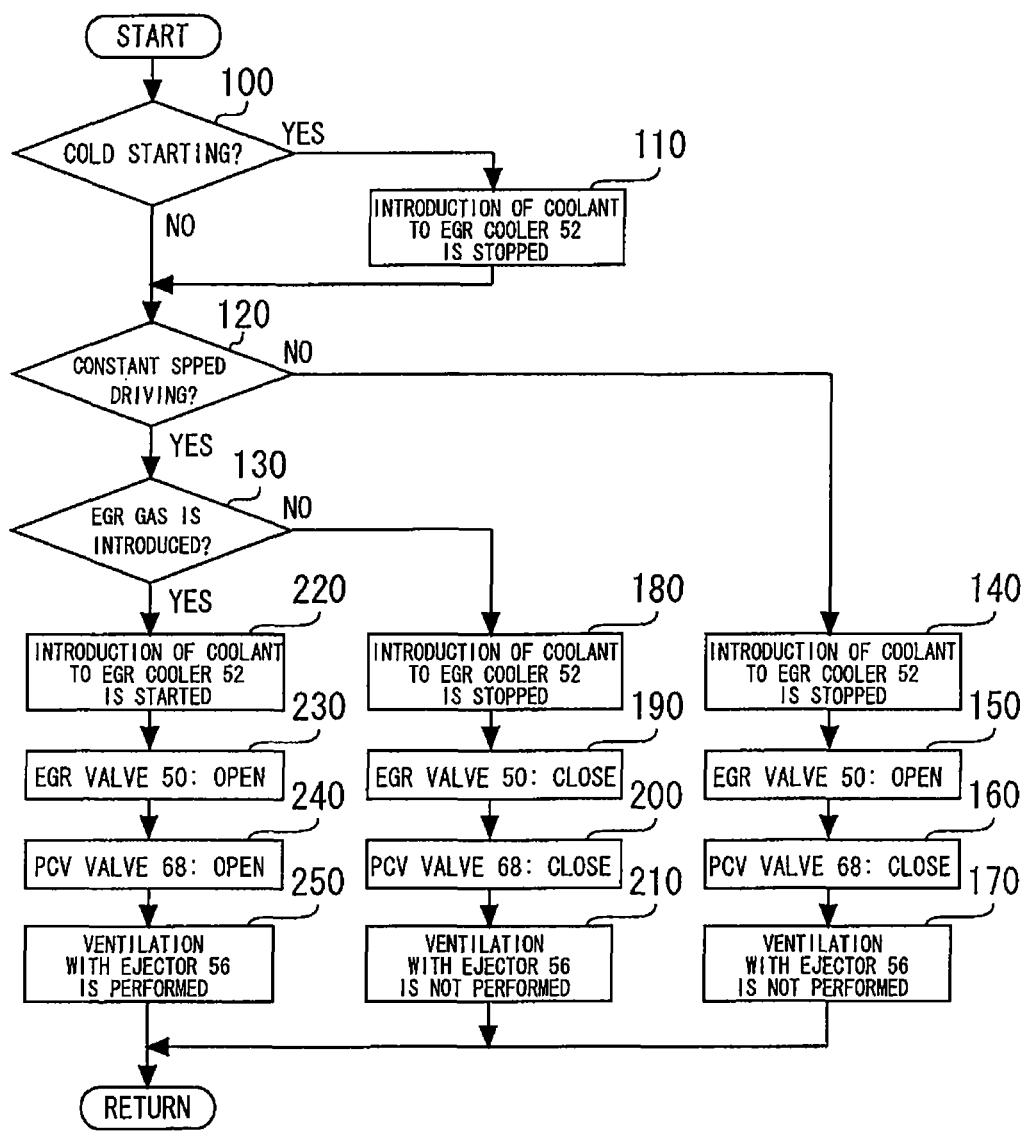
FIG. 9 is a flow chart showing a routine performed by the ECU 70 in a second embodiment.

A second embodiment of the present invention will be described below with reference to FIG. 9. This embodiment is characterized in that a routine shown in FIG. 9 is performed in the system configuration described with reference to the first embodiment.

In the first embodiment described above, control to close the PCV valve 68 is performed when the crankcase internal pressure decreases during the introduction of the EGR gas. This prevents occurrence of an unintended flow of gas, in which the EGR gas flows through the ejector 56 and the PCV passage 62 into the crankcase. Such an unintended flow of gas, however, occurs during not only the introduction of the EGR gas, but also performance of escape control. It is here noted that the escape control is to force the intake air in the intake passage 22 to be introduced into the exhaust passage 24 by way of the EGR passage 48 in order to enhance a supercharging response. During the performance of the escape control, therefore, gas present near the suction port 56a, together with the intake air that has been forced to be introduced, is likely to flow through the nozzle portion 56b and the EGR passage 48 into the exhaust passage 24. Specifically, the gas inside the crankcase can flow into the exhaust passage 24. This disables recombustion of the gas inside the crankcase with the engine 10.

The above-noted problem is attributable to the ejector 56 disposed at the EGR passage 48. There is another problem involved with the disposition of the ejector 56. Specifically, the problem is water vapor contained in the EGR gas. In addition, the EGR passage 48 also has the EGR cooler 52 disposed thereon. If the EGR gas is cooled by the EGR cooler 52 to thus have a reduced temperature, the water vapor condenses and liquefies and may thereby stagnate inside the ejector 56. Water produced by liquefaction can be discharged by flow of the exhaust gas out of the ejector 56 together with the EGR gas. Immediately after cold starting, however, the temperature of the EGR gas cooled by the EGR cooler 52 is reduced even further, so that the water produced by liquefaction may freeze. If ice produced through the freezing is accumulated inside the ejector 56, variations in the flow rate and pressure of the EGR gas result.

In this embodiment, therefore, control is performed to close the PCV valve 68 during the performance of the escape control. This prevents the unintended flow of the gas in the crankcase into the exhaust passage 24 from occurring.

In addition, in this embodiment, cooling of the gas with the EGR cooler 52 is to be suspended when the EGR gas is introduced immediately after cold starting. This prevents the water produced by liquefaction in the inside of the ejector 56 from freezing.

[Specific Processing Performed in the Second Embodiment]

Specific processing performed to achieve the above-described functions will be described below with reference to FIG. 9. FIG. 9 is a flow chart showing a routine performed by the ECU 70 in this embodiment. The routine shown in FIG. 9 is repeatedly performed at regular intervals.

In the routine shown in FIG. 9, the ECU 70 firstly determines whether cold starting is being performed (step 100). Specifically, the cold starting is determined to be being performed, when there is a request for starting the engine 10 and the coolant temperature is a predetermined temperature or lower. When it is determined in this step that the cold starting is not being performed, the ECU 70 proceeds to step 120. When it is determined in this step that the cold starting is being performed, on the other hand, the ECU 70 stops introduction of coolant to the EGR cooler 52 (step 110) and proceeds to step 120. This prevents water from freezing inside the ejector 56 even if the EGR gas is introduced.

In step 120, the ECU 70 determines whether constant speed driving is being performed. Specifically, the constant speed driving is determined to be being performed, if there is no request for supercharging response. When, in this step, the constant speed driving is determined to be being performed, the ECU 70 proceeds to step 130. When the constant speed driving is determined to be not being performed, the ECU 70 stops the introduction of the coolant to the EGR cooler 52 (step 140), opens the EGR valve 50 (step 150), and closes the PCV valve 68 (step 160) in order to perform the escape control. Ventilation by way of the ejector 56 is thereby stopped (step 170).

In step 130, the ECU 70 determines whether the EGR gas is being introduced. When, in this step, the EGR gas is determined to be not being introduced, the ECU 70 stops the introduction of the coolant to the EGR cooler 52 (step 180), closes the EGR valve 50 (step 190), and closes the PCV valve 68 (step 200) in order to promote ventilation by way of the PCV passages 58, 60, 64. Ventilation by way of the ejector 56 is thereby stopped (step 210). When the EGR gas is determined to be being introduced, on the other hand, the ECU 70 introduces the coolant to the EGR cooler 52 (step 220), opens the EGR valve 50 (step 230), and opens the PCV valve 68 (step 240). Ventilation by way of the ejector 56 is thereby performed (step 250).

As described above, in the routine shown in FIG. 9, the introduction of the coolant to the EGR cooler 52 is stopped when cold starting is determined to be being performed, water can be prevented from freezing inside the ejector 56 even if the EGR gas is introduced during cold starting. Ventilation by way of the ejector 56 is stopped when the constant speed driving is determined to be not being performed, the gas inside the crankcase can be prevented from flowing into the exhaust passage 24 during performance of the escape control. In addition, ventilation by way of the ejector 56 is stopped when the EGR gas is determined to be not being introduced, ventilation by way of the PCV passages 58, 60, 64 can be promoted. Additionally, ventilation by way of the ejector 56 is performed when the constant speed driving is determined to be being performed and the EGR gas is determined to be being introduced, the gas inside the crankcase is drawn through the PCV passage 62 and burned, together with the EGR gas or fresh air, in the engine 10.

The performance of the process of step 120 of FIG. 9 by the ECU 70 in the second embodiment described above achieves the "escape control determining means" in the second aspect of the present invention and the performance of the process of step 160 of the figure by the ECU 70 in the second embodiment described above achieves the "introduction prohibiting means" in the second aspect of the present invention.

The EGR cooler 52 in the second embodiment described above corresponds to the "exhaust cooling means" in the fourth aspect of the present invention. In addition, the performance of the process of step 100 of FIG. 9 by the ECU 70 in the second embodiment described above achieves the "cold starting determining means" in the fourth aspect of the present invention and the performance of the process of step 110 of FIG. 9 by the ECU 70 in the second embodiment described above achieves the "cooling prohibiting means" in the fourth aspect of the present invention.

DESCRIPTION OF REFERENCE NUMERALS 10 engine
22 intake passage
24 exhaust passage
26 supercharger
26a turbine
26b compressor
30, 32 air bypass passage
36, 56 ejector
36a, 56a suction port
36b, 56b nozzle portion
36c, 56c diffuser portion
48 EGR passage
50 EGR valve
52 EGR cooler
58, 60, 62, 64 PCV passage
66, 68 PCV valve
70 ECU

The invention claimed is:

1. A ventilation control apparatus for an internal combustion engine, comprising:
    a supercharger including a compressor disposed at an intake passage of an internal combustion engine and an exhaust turbine disposed at an exhaust passage of the internal combustion engine;
    a first bypass passage connecting a portion of the exhaust passage upstream of the exhaust turbine and a portion of the intake passage downstream of the compressor;
    a first PCV passage connecting, at a midway point in the first bypass passage, a cylinder head of the internal combustion engine and the first bypass passage; and
    first gas introducing means disposed at a connection point between the first bypass passage and the first PCV passage, the first gas introducing means for introducing blow-by gas flowing through the first PCV passage to the first bypass passage using a differential pressure between internal pressure in the exhaust passage upstream of the exhaust turbine and internal pressure in the intake passage downstream of the compressor.

2. The ventilation control apparatus for an internal combustion engine according to claim 1 further comprising:
    escape control determining means for determining whether there is a request for escape control that causes intake air flow to be escaped from the intake passage to the exhaust turbine via the first bypass passage; and
    introduction prohibiting means for prohibiting blow-by gas flowing through the first PCV passage from being introduced to the first bypass passage when it is determined that there is a request for the escape control.

3. The ventilation control apparatus for an internal combustion engine according to claim 1, further comprising:
    a PCV valve disposed at the first PCV passage, the PCV valve for permitting or prohibiting connection between the first PCV passage and the first gas introducing means.

4. The ventilation control apparatus for an internal combustion engine according to claim 1, further comprising:
- exhaust cooling means disposed at the first bypass passage, the exhaust cooling means for cooling exhaust to be recirculated from the exhaust passage to the intake passage;
- cold starting determining means for determining whether the internal combustion engine is under a predetermined condition for cold starting; and
- cooling prohibiting means for prohibiting the exhaust cooling means from cooling exhaust when the internal combustion engine is under the predetermined condition for cold starting.

5. The ventilation control apparatus for an internal combustion engine according to claim 1, further comprising:
- a second bypass passage for bypassing the compressor in the intake passage;
- a second PCV passage connecting, at a midway point in the second bypass passage, a cylinder head of the internal combustion engine and the second bypass passage; and
- second gas introducing means disposed at a connection point between the second bypass passage and the second PCV passage, the second gas introducing means for introducing blow-by gas flowing through the second PCV passage to the second bypass passage using a differential pressure between internal pressure in the intake passage upstream of the compressor and internal pressure in the intake passage downstream of the compressor.

6. A ventilation control apparatus for an internal combustion engine, comprising:
- a supercharger including a compressor disposed at an intake passage of an internal combustion engine and an exhaust turbine disposed at an exhaust passage of the internal combustion engine;
- a first bypass passage connecting a portion of the exhaust passage upstream of the exhaust turbine and a portion of the intake passage downstream of the compressor;
- a first PCV passage connecting, at a midway point in the first bypass passage, a cylinder head of the internal combustion engine and the first bypass passage; and
- a first gas introducing device disposed at a connection point between the first bypass passage and the first PCV passage, the first gas introducing device for introducing blow-by gas flowing through the first PCV passage to the first bypass passage using a differential pressure between internal pressure in the exhaust passage upstream of the exhaust turbine and internal pressure in the intake passage downstream of the compressor.

7. The ventilation control apparatus for an internal combustion engine according to claim 6 further comprising:
- an escape control determining device for determining whether there is a request for escape control that causes intake air flow to be escaped from the intake passage to the exhaust turbine via the first bypass passage; and
- an introduction prohibiting device for prohibiting blow-by gas flowing through the first PCV passage from being introduced to the first bypass passage when it is determined that there is a request for the escape control.

8. The ventilation control apparatus for an internal combustion engine according to claim 6, further comprising:
- a PCV valve disposed at the first PCV passage, the PCV valve for permitting or prohibiting connection between the first PCV passage and the first gas introducing device.

9. The ventilation control apparatus for an internal combustion engine according to claim 6, further comprising:
- an exhaust cooling device disposed at the first bypass passage, the exhaust cooling device for cooling exhaust to be recirculated from the exhaust passage to the intake passage;
- a cold starting determining device for determining whether the internal combustion engine is under a predetermined condition for cold starting; and
- a cooling prohibiting device for prohibiting the exhaust cooling device from cooling exhaust when the internal combustion engine is under the predetermined condition for cold starting.

10. The ventilation control apparatus for an internal combustion engine according to claim 6, further comprising:
- a second bypass passage for bypassing the compressor in the intake passage;
- a second PCV passage connecting, at a midway point in the second bypass passage, a cylinder head of the internal combustion engine and the second bypass passage; and
- a second gas introducing device disposed at a connection point between the second bypass passage and the second PCV passage, the second gas introducing device for introducing blow-by gas flowing through the second PCV passage to the second bypass passage using a differential pressure between internal pressure in the intake passage upstream of the compressor and internal pressure in the intake passage downstream of the compressor.

* * * * *